(No Model.)

O. G. TRAPHAGEN & F. W. FITZPATRICK.
INTERIOR CONDUIT.

No. 538,983. Patented May 7, 1895.

Witnesses:

Inventors
Oliver G. Traphagen
Francis W. Fitzpatrick
by Frank L. Ayer
Attorney

United States Patent Office.

OLIVER G. TRAPHAGEN AND FRANCIS W. FITZPATRICK, OF DULUTH, MINNESOTA.

INTERIOR CONDUIT.

SPECIFICATION forming part of Letters Patent No. 538,983, dated May 7, 1895.

Application filed February 4, 1895. Serial No. 537,273. (No model.)

*To all whom it may concern:*

Be it known that we, OLIVER G. TRAPHAGEN and FRANCIS W. FITZPATRICK, citizens of the United States, residing at Duluth, in the county of St. Louis and State of Minnesota, have invented certain new and useful Improvements in Interior Conduits for Wires, &c.; and we do hereby declare the following to be a full, clear, and exact description of the invention, which will enable others skilled in the art to which it appertains to make and use the same.

Our invention relates to an improved system of conduits for electric light wires, telephone and telegraph wires, pneumatic tubes, &c.

The objects of our invention are to produce an improved conduit which can be placed in position either before or after the plastering of walls and ceilings, and in which the wires or other elements can be quickly and easily secured and removed when necessary.

Another object of the invention is to provide an improved conduit for this purpose which will be of such a construction as to be practically air tight and thereby will prevent the wires or other elements therein from being affected by atmospheric changes.

A still further object of the invention is to provide a conduit for electric light wires in which the wires will be practically insulated from each other and the danger of short circuiting such wires will be overcome.

Broadly considered our invention consists in making conduits for electric light wires, telegraph and telephone wires, pneumatic tubes, &c., which can be manufactured cheaply and easily, said conduits being secured in position either before or after the plastering has been laid on, and provided with longitudinal channels therein for receiving the wires or tubes and with a glass face through which the wires or tubes may be inspected and removed when necessary, the whole device being of such an ornamental construction as not to detract from the appearance of a room in which the same may be placed.

For better comprehension of our invention attention is directed to the accompanying drawings forming a part hereof, in which—

Figure 1:
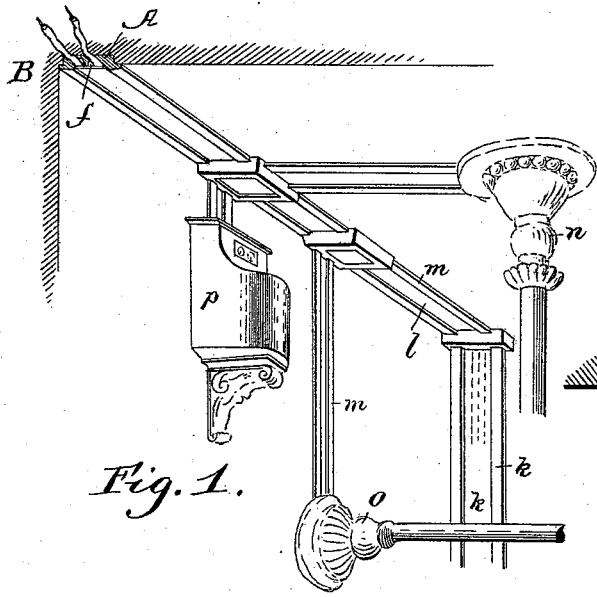
Figure 3:
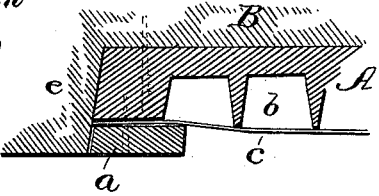
Figure 2:
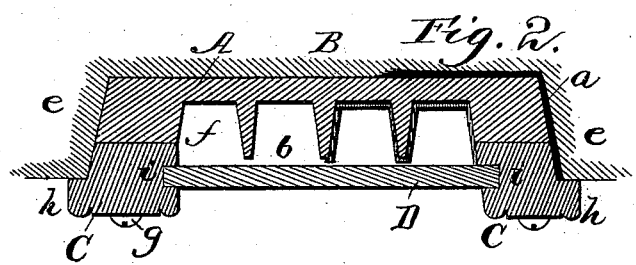
Figure 5:
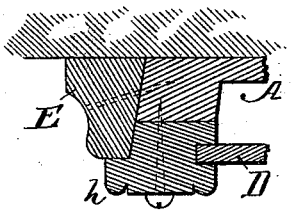
Figure 4:
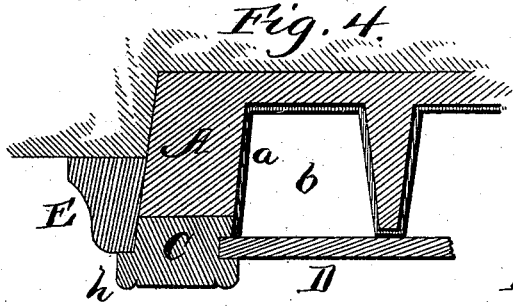
Figure 6:
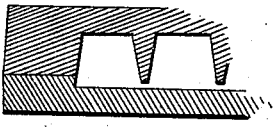

Figure 1 is a perspective view of a portion of a room, showing the same provided with our improved conduits for electric-light wires; Fig. 2, a sectional view showing the conduit in place, said conduit being embedded in the plastering and being placed in position before the plastering is applied; Fig. 3, a similar view showing the manner of protecting the channels during the operation of plastering; Fig. 4, a similar view showing the improved conduit embedded only partly in the plastering; Fig. 5, a similar view showing the conduit entirely outside of the plastering; Fig. 6, a similar view showing the arrangement of parts for protecting the conduits and wires in passing through the walls and floors, and Fig. 7 a longitudinal sectional view.

In all of the above views corresponding parts are designated by the same letters of reference.

A represents the conduit which we have invented and which is made of compressed asbestos, hard rubber, vulcabeston, so-called, wood lined with asbestos or enamel, or fire proof paint, or any other proper electrical insulating material. The said conduits are made in sections of the proper length and are preferably nailed or otherwise secured to the lathing or other foundation of the building before the plastering is placed in position. In order to protect the joints between the sections of the conduit we place a flat strip of rubber *a* over said joints as shown, so as to exclude all air and moisture from the interior of the conduits.

Figure 7:
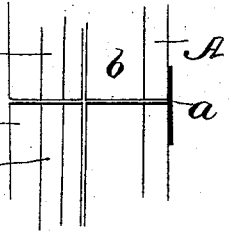

In Figs. 2 and 7, the conduit A is provided with any desired number of channels *b b b*, for receiving the wires or tubes, said channels being of the proper size for this purpose. After the conduit has been secured permanently to the back or base B, of the wall and before the plastering is placed in position, we prefer to cover the channels *b* by means of the covering *c* of paper or other material held temporarily in place by a wooden strip *a*, tacked or loosely nailed in position. After being thus protected the plastering *e* (Figs. 1 and 3) is applied to the wall, its outer surface extending preferably some distance below the conduit A, in line with the temporary strip *d*. After the plastering is thoroughly set and is dry the temporary covering *c* and strips *d* are removed and the wires or tubes *f* are placed within the channels b of the conduits A. A molding C is now secured to the said conduit A on each side thereof, by means of screws g, said molding being provided with overlapping edges h which rest upon the surface of the plastering e, and conceal any cracks which may form by the shrinkage of the plastering around the side of the conduits A.

The moldings C are provided with longitudinal slots i therein, and held in said slots is a glass face D for the conduit, the said glass face being made in sections of any suitable length and serve to support the wires or tubes f within the channels b. By removing the moldings C, or by merely loosening the same, the glass face D may be removed and the wires or tubes thereby reached for any purpose, and by making the moldings C of a corresponding length with the glass face D, it will be understood that said glass face may be cemented or otherwise secured in place to said moldings, so that the parts may be removed together.

When it is desired to pass the conduits described through a wall or floor instead of making use of the moldings C, and glass face D as explained, these parts are omitted and a simple covering plate J, preferably of the same material as the conduits may be secured thereon, in any suitable way as shown in Fig. 6.

Although we prefer to entirely embed the conduit A within the plastering as thereby a much neater and more ornamental device is secured, yet we do not want to be limited thereto, as said conduits may be mounted only partly within the plastering as shown in Fig. 4, or entirely outside of the same as shown in Fig. 5. In both of these constructions the conduits A having channels b and provided with moldings C which hold the glass face D in place are used, the only distinction being that a supplemental beading E is employed for giving finish to the device on the sides as shown.

Instead of making use of a strip of rubber a secured to the outside of the conduits over the joints between the sections thereon, it is obvious that such a strip may be secured to the inside of the conduits as shown in Fig. 4.

By means of our invention it will be obvious that we have secured a device which can be manufactured very cheaply and which can be very easily placed in position. It will be further seen, and particularly when the construction shown in Fig. 2 is used, that the device is almost entirely embedded within the ceiling or plaster of a room, and therefore can be made in the nature of an ornament. By making use of a glass face for the front of the conduit the wires or tubes will be always open to inspection and any defects or carelessness in the wiring of the building can be quickly ascertained and detected. By making the entire device of the insulating material the danger of short circuits occurring across the wires is entirely overcome.

The particular parts of the device in operation is shown in Fig. 1, which illustrates a section of a room supplied with wires carried in conduits erected as we have above explained, the mains k passing up on the sides of the room and thence along the top thereof at l, from which extend branch wires m to a central fixture n, to a wall fixture o and to a meter p, these elements being of course, of ordinary construction.

Having now fully described our invention, what we claim as new, and desire to secure by Letters Patent, is as follows:

1. An improved conduit for electric light, telephone and telegraph wires, pneumatic tubes and similar elements, comprising a flat strip A made of insulating material and having channels therein, a molding C secured to said flat strip at each side thereof, and a face or plate held in place between said moldings and supporting the wires, tubes, or other elements within said channels, substantially as set forth.

2. An improved conduit for electric light, telephone and telegraph wires, pneumatic tubes and similar elements, comprising a flat strip A made in sections of insulating material and having channels therein, said strip being secured to the laths or other foundation of a building so as to be embedded within the plaster, a molding C secured to said flat strip at each side thereof, and a face or plate held in place between said moldings and supporting the wires, tubes or other elements within said channels, substantially as set forth.

3. An improved conduit for electric light, telephone and telegraph wires, pneumatic tubes and similar elements comprising a flat strip A having channels therein, a molding C secured to said flat strip at each side and a glass face or plate held in place between said moldings, substantially as set forth.

4. An improved conduit for electric light, telephone and telegraph wires, pneumatic tubes and similar elements comprising a flat strip A secured in place within the surface of the plaster and having channels, moldings C secured to said strip at each side thereof, provided with flanges h and a glass plate or face D held in place over said channels by said moldings, substantially as set forth.

5. An improved conduit for electric light, telephone and telegraph wires, pneumatic tubes and similar elements comprising a flat strip A provided with channels therein, the molding C on each side thereof, the beading E, and a glass plate or front D, substantially as set forth.

In testimony whereof, we affix our signature in presence of two witnesses.

OLIVER G. TRAPHAGEN.
FRANCIS W. FITZPATRICK.

Witnesses:
W. T. BRAY,
P. M. NASH.